United States Patent
Ramanarayanan et al.

(10) Patent No.: US 9,158,511 B2
(45) Date of Patent: Oct. 13, 2015

(54) SCALABLE PARTIAL VECTORIZATION

(71) Applicant: Advanced Micro Devices, Inc., Sunnyvale, CA (US)

(72) Inventors: Ramshankar Ramanarayanan, Bangalore (IN); Meghana Gupta, Bangalore (IN); Soham S. Chakraborty, Bangalore (IN); Dibyendu Das, Bangalore (IN)

(73) Assignee: Advanced Micro Devices, Inc., Sunnyvale, CA (US)

( * ) Notice: Subject to any disclaimer, the term of this patent is extended or adjusted under 35 U.S.C. 154(b) by 122 days.

(21) Appl. No.: 13/897,942

(22) Filed: May 20, 2013

(65) Prior Publication Data

US 2014/0344555 A1    Nov. 20, 2014

(51) Int. Cl.
*G06F 9/45*    (2006.01)
(52) U.S. Cl.
CPC .......................................... *G06F 8/40* (2013.01)
(58) Field of Classification Search
None
See application file for complete search history.

(56) References Cited

U.S. PATENT DOCUMENTS

| | | | | |
|---|---|---|---|---|
| 6,438,741 | B1 * | 8/2002 | Al-omari et al. | 707/694 |
| 7,036,117 | B2 * | 4/2006 | Garvey | 717/159 |
| 8,196,127 | B2 * | 6/2012 | Gschwind | 717/154 |
| 8,201,159 | B2 * | 6/2012 | Gschwind | 717/154 |
| 8,621,448 | B2 * | 12/2013 | Gonion | 717/157 |
| 8,640,112 | B2 * | 1/2014 | Yi et al. | 717/149 |
| 2003/0188299 | A1 * | 10/2003 | Broughton et al. | 717/141 |
| 2004/0003381 | A1 * | 1/2004 | Suzuki et al. | 717/150 |
| 2005/0273769 | A1 * | 12/2005 | Eichenberger et al. | 717/136 |
| 2005/0273770 | A1 * | 12/2005 | Eichenberger et al. | 717/136 |
| 2005/0283769 | A1 * | 12/2005 | Eichenberger et al. | 717/151 |
| 2005/0283773 | A1 * | 12/2005 | Eichenberger et al. | 717/151 |
| 2005/0283774 | A1 * | 12/2005 | Eichenberger et al. | 717/151 |
| 2007/0136561 | A1 * | 6/2007 | Whalley et al. | 712/209 |
| 2007/0174825 | A1 * | 7/2007 | Eichenberger et al. | 717/140 |
| 2008/0034360 | A1 * | 2/2008 | Bodin et al. | 717/154 |
| 2008/0222391 | A1 * | 9/2008 | Eichenberger et al. | 712/204 |
| 2010/0281528 | A1 * | 11/2010 | Hayton et al. | 726/7 |
| 2013/0104118 | A1 * | 4/2013 | Somani et al. | 717/173 |
| 2013/0318511 | A1 * | 11/2013 | Tian et al. | 717/157 |
| 2014/0096119 | A1 * | 4/2014 | Vasudevan et al. | 717/160 |
| 2014/0122832 | A1 * | 5/2014 | Ngai et al. | 712/7 |

OTHER PUBLICATIONS

Gang Ren, Compiling Vector Programs for SIMD Devices, publihsed by University of Illinois, 2006, pp. 1-140.*

(Continued)

*Primary Examiner* — Tuan Q. Dam
*Assistant Examiner* — Zheng Wei
(74) *Attorney, Agent, or Firm* — Volpe and Koenig, P.C.

(57) ABSTRACT

A system, method and computer program product to compute latencies of a plurality of expression trees in a basic block and to select a first and a second expression tree from the plurality of expression trees based on the computed latencies. The first expression tree is isomorphic to the second expression tree and the first and second expression trees are selected in order of largest to smallest latency. This selection ensures that the largest isomorphic expression trees are vectorized first. By vectorizing the largest isomorphic expression trees first, a basic block containing hundreds of statements can be vectorized without significant compile time. Moreover, vectorization of the largest isomorphic expression trees results in a significant improvement in system performance on SIMD processors.

21 Claims, 8 Drawing Sheets

(56) References Cited

OTHER PUBLICATIONS

Progsch et al., A New Vectorization Technique for EXpression TEmplates in C++, published by ACM, Sep. 2011, pp. 1-15.*
Francois Ferrand, Optimization and code parallelization for processors with multimedia SIMD instructions, published Aug. 2003, pp. 1-64.*
Barik et al., "Efficient Selection of Vector Instructions using Dynamic Programming," 43$^{rd}$ Annual IEEE/ACM International Symposium on Microarchitecture (MICRO), 2010; 12 pages.
Chang et al, "Efficient Vectorization of SIMD Programs with Non-aligned and Irregular Data Access Hardware," Proceedings of the 2008 International Conference on Compilers, Architectures, and Synthesis for Embedded Systems (CASES '08), Oct. 2008; pp. 167-175.
Das et al., "Experience with Partial Simdization in Open64 Compiler using Dynamic Programming," 33$^{rd}$ ACM SIGPLAN Conference on Programming Language Design and Implementation (PLDI '12), Open64 Workshop, Jun. 11, 2012; pp. 1-10.
Eichenberger et al., "Vectorization for SIMD Architectures with Alignment Constraints," Proceedings of ACM SIGPLAN 2004 Conference on Programming Language Design and Implementation (PLDI '04), Jun. 2004; 12 pages.
Kim et al., "Efficient SIMD Code Generation for Irregular Kernels," Proceedings of the 17$^{th}$ ACM SIGPLAN Symposium on Principles and Practice of Parallel Programming (PPoPP '12), Feb. 2012; pp. 55-64.
Larsen et al., "Exploiting Superword Level Parallelism with Multimedia Instruction Sets," Proceedings of ACM SIGPLAN 2000 Conference on Programming Language Design and Implementation (PLDI '00), Jun. 2000; pp. 145-156.
Larsen et al., "Increasing and Detecting Memory Address Congruence," Proceedings of the 2002 International Conference on Parallel Architectures and Compilation Techniques (PACT '02), Sep. 2002; pp. 18-29.
Larsen et al., "Techniques for Increasing and Detecting Memory Alignment," MIT LCS Technical Memo, MIT-LCS-TM-621, Nov. 2001; pp. 1-11.
Liu et al., "A Compiler Framework for Extracting Superword Level Parallelism," Proceedings of the 33$^{rd}$ ACM SIGPLAN Conference on Programming Language Design and Implementation (PLDI '12) Jun. 2012; pp. 347-357.
Nuzman et al., "Auto-Vectorization of Interleaved Data for SIMD," IBM Research Report, H-0235 (H0512-001), Nov. 30, 2005; 11 pages.
Nuzman et al., "Outer-Loop Vectorization—Revisited for Short SIMD Architectures," Proceedings of the 17$^{th}$ International Conference on Parallel Architectures and Compilation Techniques (PACT '08), Oct. 2008; pp. 2-11.
Park et al., "SIMD Defragmenter: Efficient ILP Realization on Data-parallel Architectures," Proceedings of the 17$^{th}$ International Conference on Architectural Support for Programming Languages and Operating Systems (ASPLOS '12), Mar. 2012; 12 pages.
Shin, "Introducing Control Flow into Vectorized Code," Proceedings of the 16$^{th}$ International Confderence on Parallel Architecture and Compilation Techniques (PACT '07), Sep. 2007; 12 pages.
Shin et al., "Superword-Level Parallelism in the Presence of Control Flow," Proceedings of the International Symposium on Code Generation and Optimization (CGO '05), Mar. 2005; pp. 1-11.
Tanaka et al., "A New Compilation Technique for SIMD Code Generation across Basic Block Boundaries," Proceedings of the 15$^{th}$ Asia South Pacific Design Automation Conference (ASP-DAC 2010), Jan. 2010; pp. 101-106.
Wu et al., "Efficient SIMD Code Generation for Runtime Alignment and Length Conversion," Proceedings of the 2005 International Symposium on Code Generation and Optimization (CGO 2005), Mar. 2005; pp. 153-164.

* cited by examiner

```
// example for partial vectorization
double foo (double X1, double Y1, double c, double d, double f, double g, double h, double i) {
    double R1;
    double R2;
    double b;
    double f;
statement1:
    b = X1 + 2;
statement2:
    R1 = ( ( a * e + d ) * a + c ) * a + b;
statement3:
    f = Y1 - 2;
statement4:
    R2 = ( ( a * i + h ) * a + g ) * a + f;
statement5:
    return R1 + R2;
}
```

Figure 1

| Cycle count | $x_1$ | 2 | $y_1$ | 2 | a | c | d | E | f | g | h | 1 | i |
|---|---|---|---|---|---|---|---|---|---|---|---|---|---|
| 0 | $x_1+2$ | | $y_1-2$ | | | | | | | | | | |
| 1 | $b = x_1+2$ | | $f = y_1-2$ | | | | | $a*e$ | | | | | |
| 2 | | | | | | | | $a*e+d$ | | | | | $a*i$ |
| 3 | $(a*e+d)*a$ | | | | | | | | | | | | $a*i+h$ |
| 4 | $(a*e+d)*a+c$ | | | | | | | | | $(a*i+h)*a$ | | | |
| 5 | $((a*e+d)*a+c)*a$ | | | | | | | | | $(a*i+h)*a+g$ | | | |
| 6 | $((a*e+d)*a+c)*a+b$ | | | | | | | | | $((a*i+h)*a+g)*a$ | | | |
| | | | | | | | | | | $((a*i+h)*a+g)*a+f$ | | | |
| 7 | $R1 = (((a*e+d)*a+c)*a+b)$ | | | | | | | | | $R2 = (((a*i+h)*a+g)*a+f)$ | | | |
| 8 | $R1 + R2$ | | | | | | | | | | | | |
| 9 | return $R1 + R2$ | | | | | | | | | | | | |

Figure 2

```
LOAD Identifier<b> Type<double>
LOAD Identifier<a> Type<double>
LOAD Identifier<c> Type<double>
LOAD Identifier<a> Type<double>
LOAD Identifier<d> Type<double>
LOAD Identifier<e> Type<double>
LOAD Identifier<a> Type<double>
    MPY Type<double>
    ADD Type<double>
    MPY Type<double>
    ADD Type<double>
STORE Identifier<R2> Type<double>
        Statement 2
```

```
LOAD Identifier<f> Type<double>
LOAD Identifier<a> Type<double>
LOAD Identifier<g> Type<double>
LOAD Identifier<a> Type<double>
LOAD Identifier<h> Type<double>
LOAD Identifier<i> Type<double>
LOAD Identifier<a> Type<double>
    MPY Type<double>
    ADD Type<double>
    MPY Type<double>
    ADD Type<double>
STORE Identifier<R2> Type<double>
        Statement 4
```

Figure 3A

```
LOAD Identifier<> Type<double>
LOAD Identifier<> Type<double>
LOAD Identifier<> Type<double>
LOAD Identifier<> Type<double>
LOAD Identifier<> Type<double>
LOAD Identifier<> Type<double>
LOAD Identifier<> Type<double>
    MPY Type<double>
    ADD Type<double>
    MPY Type<double>
    ADD Type<double>
STORE Identifier<> Type<double>
```

Figure 3B

```
LOAD Identifier<b> Type<double>
LOAD Identifier<f> Type<double>
PACK Type<Vector128Double>                              401
STORE Identifier<b_f> Type<Vector128Double>

LOAD Identifier<a> Type<double>
LOAD Identifier<a> Type<double>
PACK Type<Vector128Double>                              402
STORE Identifier<a_a> Type<Vector128Double>

LOAD Identifier<c> Type<double>
LOAD Identifier<g> Type<double>
PACK Type<Vector128Double>                              403
STORE Identifier<c_g> Type<Vector128Double>

LOAD Identifier<d> Type<double>
LOAD Identifier<h> Type<double>
PACK Type<Vector128Double>                              404
STORE Identifier<d_h> Type<Vector128Double>

LOAD Identifier<e> Type<double>
LOAD Identifier<i> Type<double>
PACK Type<Vector128Double>                              405
STORE Identifier<e_i> Type<Vector128Double>

LOAD Identifier<b_f> Type<Vector128Double>
 LOAD Identifier<a_a> Type<Vector128Double>
  LOAD Identifier<c_g> Type<Vector128Double>
   LOAD Identifier<a_a> Type<Vector128Double>
    LOAD Identifier<d_h> Type<Vector128Double>
     LOAD Identifier<e_i> Type<Vector128Double>  406
      LOAD Identifier<a_a> Type<Vector128Double>
MPY Type<Vector128Double>
ADD Type<Vector128Double>
MPY Type<Vector128Double>
ADD Type<Vector128Double>
MPY Type<Vector128Double>
ADD Type<Vector128Double>
STORE Identifier<R1_R2> Type<Vector128Double>

LOAD Identifier<R1_R2> Type<Vector128Double>
UNPACK 1                                                407
STORE Identifier<R1> Type<double>

LOAD Identifier<R1_R2> Type<Vector128Double>
UNPACK 0                                                408
STORE Identifier<R2> Type<double>
```

<S1, S2> and <S3, S4> are grouped for vectorization.

For <S1, S2>, we require <a, b> and <p, q> packing.
For <S3, S4>, we require <b, a> and <p, q> packing.

---

<a, b> = pack(a, b);
<p, q> = pack(p, q);
<x, y> = <a, b> + <p, q>
<z, u> = pack(unpack(<a, b>, 2), unpack<a, b>, 1)) + <p, q>

702

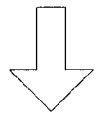

<a, b> = pack(a, b);
<p, q> = pack(p, q);
<x, y> = <a, b> + <p, q>
<z, u> = shuffle(<a, b>, <a, b>, 1) + <p, q>

703

<b, a> packing can be obtained by permuting <a, b> packing using SHUFPD instruction.

Figure 7

SCALABLE PARTIAL VECTORIZATION

BACKGROUND

1. Field

The present disclosure is generally directed to automatic vectorization. More particularly, the present disclosure is directed to partial vectorization.

2. Background Art

Modern microprocessors support Single Instruction Multiple Data (SIMD) instructions. SIMD instructions enable microprocessors to exploit data level parallelism. Specifically, a SIMD instruction performs the same identical action simultaneously on two or more pieces of data.

There are two ways to utilize the SIMD capabilities of a microprocessor. First, a programmer can write SIMD assembly language instructions. Second, a compiler can perform autovectorization. Autovectorization is a compiler transformation that automatically generates SIMD instructions for a program loop or a sequentially executing block of instructions, e.g. a basic block.

The autovectorization of code other than program loops (e.g. basic blocks) has become increasingly important in maximizing program performance. The autovectorization of basic block code is called partial vectorization or partial "simdization." Partial vectorization has been demonstrated to improve performance in many independent studies.

Partial vectorization involves analyzing a basic block and identifying groups of identical instructions which can be executed independently of each other. These groups of instructions are converted to one or more vector instructions. The number of vector instructions generated is based on the width of the vector registers of a microprocessor.

If a basic block does not contain groups of identical instructions which can be executed independently of each other, then partial vectorization is not applied to the basic block. Alternatively, if a basic block contains groups of identical instructions which can be executed independently of each other, then those instructions are converted to vector instructions. Instructions in the basic block which are not vectorized are called scalar instructions. Thus, a basic block may contain both vector and scalar instructions.

Traditional approaches to partial vectorization have suffered from scalability issues. Specifically, it has been a challenge applying partial vectorization algorithms because analyzing basic blocks with large numbers of instructions is time consuming. Currently, there are two dominant approaches to partial vectorization: dynamic programming algorithms and greedy algorithms.

Dynamic programming applies a bottom-up approach to partial vectorization. Specifically, the input basic block is represented as a Directed Acyclic Graph (DAG). The DAG is built by connecting every variable's definition to its uses. Dynamic programming is then applied to the DAG. Specifically, the packing and unpacking costs of vectorization are propagated recursively from the leaves of the DAG to their parents and so on.

Dynamic programming generates the smallest number of packing and unpacking instructions. In addition, dynamic programming vectorizes the longest expressions in the basic block which thereby maximizes the number of instructions vectorized. However, compile time for dynamic programming is high and it does not scale when there are hundreds of high level statements in the basic block. Specifically, because all independent and isomorphic expressions are compared with each other, the compile time is extremely high when compiling basic blocks containing hundreds of statements.

Greedy programming, on the other hand, makes the locally optimal choice at each stage of vectorization with the hope of finding a global optimum. Greedy algorithms have reasonable compile time and scale when there are hundreds of high level statements in the basic block. However, greedy programming does not usually produce an optimal solution, e.g., it does not maximize the number of instructions vectorized. Specifically, there is no guarantee that the longest expressions in the basic block will get vectorized. Nor is there any guarantee that the packing and unpacking costs of vectorization will be minimized.

SUMMARY

What is therefore needed is a mechanism to perform partial vectorization that has reasonable compile time, scales when there are hundreds of high level statements in the basic block and performs vectorization on the longest expressions in the basic block.

Embodiments, under certain circumstances, include a method for generating vectorization code by computing latencies of a plurality of expression trees in a basic block. The method further includes selecting a first and a second expression tree from the plurality of expression trees based on the computed latencies, such that the first expression tree is isomorphic and independent to the second expression tree. Finally, the method includes generating a vectorization code based on the first and second expression trees.

The method allows reasonable compile time, scales effectively and generates significant vectorization. As a result, data level parallelism can be exploited which improves system performance, particularly of high performance computing applications, and reduces power consumption.

Further features and advantages of the embodiments, as well as the structure and operation of the embodiments, are described in detail below with reference to the accompanying drawings. It is noted that the embodiments are not limited to the specific embodiments described herein. Such embodiments are presented herein for illustrative purposes only. Additional embodiments will be apparent to a person of ordinary skill in the relevant art based on the teachings contained herein.

BRIEF DESCRIPTION OF THE DRAWINGS

The accompanying drawings, which are incorporated herein and form a part of the specification, illustrate embodiments and, together with the description, further serve to explain the principles of the embodiments and to enable a person of ordinary skill in the relevant art to make and use the invention.

FIG. 1 is an example C/C++ function which is used to describe performing scalable partial vectorization, according to an embodiment.

FIG. 2 represents the computed latencies of expressions in the C/C++ function in FIG. 1, according to an embodiment.

FIG. 3A illustrates the intermediate code representations of statements 2 and 4 in FIG. 1.

FIG. 3B is the common intermediate code representation of statements 2 and 4 in FIG. 1, according to an embodiment.

FIG. 4 is the generated partial vectorization code for statements 2 and 4 in FIG. 1, according to an embodiment.

FIG. 7 illustrates a vector register packing and unpacking optimization, according to an embodiment.

DETAILED DESCRIPTION

Figure 5:
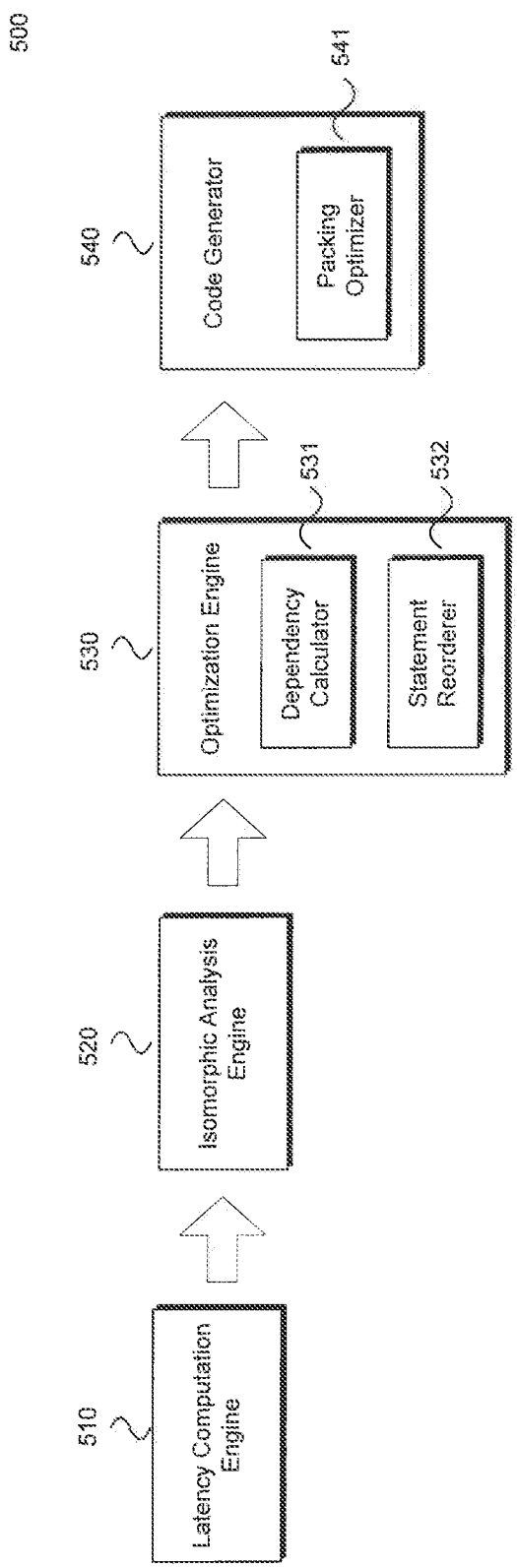
FIG. 5 illustrates a block diagram of the scalable partial vectorization system, according to an embodiment.

An embodiment provides a latency computation engine configured to calculate latencies between dependent expressions, an isomorphic analysis engine configured to determine whether two expressions are isomorphic to each other, an optimizer, and a code generator configured to generate partial vectorization code. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the embodiments, and well-known elements of the embodiments may not be described in detail or may be omitted so as not to obscure the relevant details of the embodiments. In addition, the terminology used herein is for the purpose of describing particular embodiments only and is not intended to be limiting of the embodiments. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

FIG. 1 is an example C/C++ function which is used to describe performing scalable partial vectorization, according to an embodiment. There are eight arguments to the function, i.e., X1, Y1, c, d, f, g, h and i. Each argument is of variable type double. The arguments are used in the statements labeled statement 1, statement 2, statement 3 and statement 4. The statements are composed of one or more expressions, e.g. X1+2. The evaluations of the expressions in statement 1 through statement 4 are stored in double variables R1 and R2. Variables R1 and R2 are added to obtain the return value in statement 5.

Except for the two addition expressions in statement 2 and statement 4 which require variables b and f from statement 1 and statement 3, the remaining expressions in statement 2 and statement 4 do not depend on the other expressions in the function. Moreover, the addition expressions involving variables b and f do not depend on the other expressions in statement 2 and statement 4. In other words, all the expressions in statement 2 and statement 4 can be evaluated independently of each other.

In addition to being independent of each other, the expressions in statement 2 and statement 4 are identical to each other except for their operands. When two expressions are the same except for their operands, they are isomorphic expressions.

Partial vectorization involves vectorizing groups of independent, isomorphic expressions. For example, each addition expression in statement 2, except for the addition expression that adds b, is independent and isomorphic to the addition expressions in statement 1. Likewise, all the addition expressions in statement 2 are independent and isomorphic to all the addition expressions in statement 4. Similarly, each multiplication expression in statement 2 is isomorphic and independent to each multiplication expression in statement 4.

Once independent and isomorphic expressions in basic block statements are identified, they can be vectorized by the compiler. Specifically, the operands of the independent and isomorphic expressions are packed into vector registers. For example, the double floating point expression (a*e) of statement 2 and (a*i) of statement 4 are vectorized by twice packing operand a into a vector register, e.g. <a, a>. Similarly, operands e and i are packed into another vector register, e.g. <e, i>. After packing, the operands appear in the high and low order bits of the vector register.

Different microprocessor architectures provide different instructions to perform the packing and unpacking of operands to and from vector registers. For example, in the x86 microprocessor architecture, the unpcklpd SSE instruction is used to perform unpacking.

After packing the operands into the vector registers, the common operation in the independent and isomorphic expressions is applied to the packed vector registers. For example, in the cases of (a*e) and (a*i), the vector registers containing <a, a> and <e, i> are multiplied together using the SIMD multiply instruction of a microprocessor. For example, the mulpd instruction is used in the x86 microprocessor architecture to multiply two vector registers containing double precision floating point operands.

The multiplication result is stored in a vector register. Specifically, the vector register contains (a*e) in the high order bits and (a*i) in the low order bits. The high and low order bits are then extracted from the vector register using the unpack instruction of a microprocessor. For example, in the x86 microprocessor architecture, the unpckld instruction is used to extract the high and low order bits from the vector register.

The vectorization of independent, isomorphic expressions can increase system performance. However, vectorization may be balanced against the number of CPU cycles incurred while executing packing and unpacking instructions. For a given basic block, it is often non-trivial to reduce the number of packing and shuffling instructions.

Traditional approaches to partial vectorization either suffer from high compile time or produce non-optimal vectorized code. In the case of non-optimal vectorized code, either the number of instructions that are vectorized is not maximized or the number of packing and unpacking instructions is not minimized.

In the dynamic programming approach, a directed acyclic graph (DAG) is built by connecting every variable's definition to its uses. Dynamic programming is then applied on the DAG and the packing and unpacking costs are propagated recursively from the leaves of the DAG to their parents and so on. The result contains the smallest number packing and unpacking instructions. This is a result of the dynamic programming approach finding the longest independent, isomorphic expressions in the basic block.

Moreover, because vectorization is targeted to the longest expressions in the basic block, the number of instructions that are vectorized is maximized. For example, in FIG. 1, statement 2 and statement 4 will get entirely vectorized with dynamic programming. In other words, statement 2 and statement 4 are identified as the longest expressions in the basic block that are independent and isomorphic.

While dynamic programming generates vectorization code with the minimum number of packing and unpacking instructions, it also compares all independent and isomorphic expressions against each other. As a result, the compile time is high when compiling basic blocks containing hundreds of statements. Dynamic programming, therefore, does not scale effectively.

Alternatively, greedy algorithms have reasonable compile time and scale effectively even when there are hundreds of statements in the basic block. This is because greedy algorithms make a locally optimal choice at each stage of vectorization with the hope of finding a global optimum. While compile time is often fast, greedy algorithms do not usually produce an optimal solution, e.g., a solution with minimal packing and unpacking instructions combined with maximal vectorization of instructions. Specifically, greedy algorithms rarely result in the longest expressions in the basic block being vectorized. Nor does greedy programming usually minimize the costs of packing and unpacking operands in vector registers.

According to an embodiment herein, however, maximal instruction vectorization can be achieved, and packing and unpacking costs minimized. This is done by using string pattern matching and extending the isomorphism analysis from individual operations to expressions composed of multiple operations. Moreover, compile time is reduced by only considering for vectorization groups of expressions that have the same cycle-count. The cycle-count or latency is an integer that represents the length of the dependency chain for an expression.

As discussed above, a statement in a basic block may contain one or more expressions. Moreover, an expression is made up of one or more operations and operands. For example in FIG. 1, statement 2 is composed of operands a, b, c, d and e. In addition, statement 2 is composed of three multiplication operations, three addition operations and an assignment operation.

In order to determine if a collection of expressions can be vectorized, two requirements must be met. First, the expressions must be the same except for their identifier names, i.e., they must be structurally isomorphic. Second, there must be no flow-dependencies, anti-dependencies or output-dependencies between the expressions. For example, assume statement 2 follows statement 1 in a basic block in the original program. A flow-dependency occurs when statement 2 loads from the stored location of statement 1. An anti-dependency occurs when statement 2 stores in a location from which statement 1 loads. An output-dependency occurs when statement 2 stores in the same location as statement 1.

For large basic blocks there will likely be many expressions that satisfy both requirements. In other words, the choice of which expressions to vectorize will require complex analysis in order to determine which combination of expressions will generate the optimal solution. Therefore, it is useful to reduce the number of choices to consider in order to minimize compile time.

According to an embodiment, the analysis of the above two requirements is integrated together with the need to reduce the number of choices for vectorization. Specifically, the number of choices is reduced by vectorizing only isomorphic and independent expressions with the same latency or cycle-count. This is done by generating a latency table which represents the dependence relations between expressions and their operands by assigning each expression an integer called latency or cycle-count. Specifically, all the basic blocks are iterated over in the input program and expressions in the basic blocks are grouped together if they are independent, isomorphic and have the same latency.

FIG. 2 represents the computed latencies of the expressions in the C/C++ function in FIG. 1, according to an embodiment. This latency table also represents the dependence relations between the basic block expressions.

Dependencies determine the order of execution for the statements of the basic block. There are three kinds of dependencies: flow-dependence, anti-dependence and output-dependence. For example, assume statement 2 follows statement 1 in a basic block in the original program. A flow-dependency occurs when statement 2 loads from the stored location of statement 1. An anti-dependency occurs when statement 2 stores in a location from which statement 1 loads. An output-dependency occurs when statement 2 stores in the same location as statement 1.

The latency table in FIG. 2 represents the dependence relations between the expressions making up the statements in the basic block of FIG. 1. Each expression or operand is assigned an integer called latency or cycle-count. The latency of an expression or operand is computed by adding one to the largest cycle-count of the dependencies of an expression. If statement 1 depends on statements 2 and 3, and if the cycle-count of statement 2 is greater than the cycle-count of statement 3, then the cycle-count of statement 1 is the cycle-count of statement 2 plus one. The cycle-count of arguments of a function or constants are assumed to be zero.

In FIG. 2, the return expression in statement 5 has the largest cycle-count, i.e., nine. All entries in the latency table with the same cycle-count can be executed in parallel. For example, (b=X1+2), (f=Y1−2), (a*e+d) and (a*i+h) have the same latency in FIG. 2. Thus, these expressions can be executed in parallel. However, while these expressions can be executed in parallel, they are not necessarily capable of being vectorized. In order to be vectorized, the expressions must be isomorphic and independent.

After calculating the latencies of the expressions and their operands, the latency table in FIG. 2 is traversed from largest latency to smallest latency. This traversal is performed in order to determine what expressions can be vectorized. During the traversal, isomorphic expressions with the same latencies are grouped together. Traversing from largest latency to the smallest latency ensures that the statements (i.e. complete expressions) are vectorized before their constituent expressions. This ensures that the vectorization of the longest expressions is performed first, and that minimal packing and unpacking operations are performed. Thus, without the cost of dynamic programming, the scalable partial vectorization approach automatically captures the largest isomorphic expressions for vectorization.

In order to determine whether two expressions are isomorphic, the expression are converted to strings and compared. Specifically, the expressions are represented as expression trees and their operands are dropped. If the resulting strings are the same, then the expressions are isomorphic.

FIG. 3A illustrates the expression tree representations of statements 2 and 4 in FIG. 1. Because the two expression trees are independent, they can be executed in parallel. In addition, because the expression trees differ only by their identifiers, they are isomorphic. Finally, because the expression trees are independent, isomorphic and have the same cycle-count of seven in the latency table of FIG. 2, they can be vectorized using the scalable partial vectorization approach, e.g., executed using SIMD instructions.

In order to determine whether the two expression trees in FIG. 3A are isomorphic, the expression trees are converted to strings and compared. Specifically, the identifiers in the expression trees are dropped and the resulting strings are compared. If the resulting strings are identical, then the expression trees are isomorphic to each other.

FIG. 3B is the common intermediate expression tree representation of statements 2 and 4 in FIG. 1. Specifically, FIG. 3B illustrates the shared expression tree string representation of statements 2 and 4 after their identifiers have been dropped. In other words, both expression trees representing statements 2 and 4 are identical after dropping their identifiers. Therefore, the expressions trees of statements 2 and 4 are isomorphic.

After traversing the latency table from largest to smallest latency to find groups of expression trees that are independent, isomorphic and have the same latency, the identified groups of expression trees are vectorized. Specifically, the operands in the expression trees are grouped into vector sized parts. For example, if there are 6 independent, isomorphic expression trees with the same latency, and if a vector register of a microprocessor supports storing two operands of the type indicated in the expression trees, then 3 vector registers (e.g. 6/2) will be used for the vectorization of the expression trees.

As discussed above, the process of placing the expression operands into vector registers is called packing. Typically, the microprocessor provides packing and unpacking instructions. The packing instruction creates a vector from one or more scalars, e.g. the operands of the expressions. The unpack instruction is the inverse of the packing instruction. It extracts scalars (e.g. the operands of the expressions) from the vector register. Extraction of scalars from a vector register is typically done by using an integer to index into the vector register and extracting the corresponding scalar (e.g. operand) at that index.

Often the choice of which expression operands are packed in a vector register has an impact on the quality of the generated code. According to an embodiment, expression tree operands are packed in the order their corresponding statements appear in the original source code. A person of ordinary skill in the art, however, would appreciate that expression tree operands may be packed in a different order than the order the corresponding statements appear in the source code.

In addition to choosing how to pack operands, the generation of vectorization code is often easier if the statements in the original source code of the basic block are reordered. For example, in FIG. 1, statement 2 and statement 4 are vectorizable, i.e., they are independent, isomorphic and have the same latency in the latency table. Moreover, statement 3 must be evaluated before statement 4 because statement 4 loads the variable f which is modified in statement 3. Therefore, after vectorizing statement 2 and 4, the compiler may insert the resulting vector code after the last store to f.

According to an embodiment, however, the statements in the basic block can be reordered. Specifically, all the statements that the vectorized statement depends on are moved before the expressions being vectorized. As a result, the vectorized expressions become adjacent and conversion to vector instructions are simplified.

In order to do the statement reordering, the dependencies of the basic block are computed using a compute dependencies algorithm. Specifically, after encountering a load or store operation, subsequent operations are examined to determine if they have a flow, anti-flow or output dependency to the earlier load or store. A person of reasonable skill in the art would be aware of various other algorithms that compute dependencies in a basic block.

After computing the dependencies, a topological reordering algorithm traverses the computed dependencies in depth-first order of occurrence and rewrites the basic block accordingly. Specifically, the dependent expression trees of each expression tree are visited first. The statements in the basic block are then reordered according to the order the dependent expression trees are visited. Each set of expressions to be vectorized is then replaced with corresponding vectorization code.

FIG. 4 is the generated partial vectorization code for statements 2 and 4 in FIG. 1, according to an embodiment. Intermediate code 401 shows the loading of double variables b and f in statements 2 and 4 respectively. Variables b and f are then packed and stored into a vector register of width 128-bit double. Similarly, intermediate code 402 shows the loading of the double variable a in statements 2 and 4. Variable a is then packed and stored in both the high and low portions of a vector register of width 128-bit double. Likewise, variables c and g, d and h, and e and i in intermediate code 403, 404 and 405 respectively are packed and stored in vector registers of width 128-bit double.

Intermediate code 406 shows the loading of the various vector registers in intermediate code 401-405. In addition, intermediate code section 406 shows the application of vectorization to the expression trees making up statements 2 and 4 and their corresponding operands in the loaded vector registers.

Intermediate code 407 show the extraction of the R1 result for the expression tree making up statement 2 from the vector register containing both R1 and R2. Similarly, intermediate code 408 show the extraction of the R2 result for the expression tree making up statement 4 from the vector register containing both R1 and R2.

FIG. 5 is a block diagram of the partial vectorization system 500, according to an embodiment. The partial vectorization system 500 includes a latency computation engine 510, an isomorphic analysis engine 520, an optimization engine 530, and a code generator 540.

In an embodiment, latency computation engine 510 receives the intermediate code representation of a basic block for analysis. The latency computation engine 510 analyzes the intermediate representation code in the basic block to generate a latency table that represents the dependence relations between expressions and their operands by assigning each expression an integer called cycle-count. In an alternative embodiment, latency computation engine 510 receives the original source code of a basic block for analysis.

Latency computation engine 510 computes the cycle-counts of expression trees and their operands by adding one to the largest cycle-count of the dependencies of an expression tree. If expression 1 depends on expressions 2 and 3, and if the cycle-count of expression 2 is greater than the cycle-count of expression 3, then cycle-count of expression 1 is the cycle-count of expression 2 plus one. For example, in the case of FIG. 2, the largest cycle-count is 9 of the return expression of statement 5. The cycle-count of arguments of a function or constants in a basic block are assumed to be zero.

In addition, all expressions in the latency table with the same cycle-count can be executed in parallel. For example, (b=X1+2), (f=Y1−2), (a*e+d) and (a*i+h) have the same latency in FIG. 2 and thus can be executed in parallel. However, while these expressions can be executed in parallel they are not necessarily vectorizable. In order to be vectorized, the expressions must be isomorphic and independent.

After generating the latency table, isomorphic analysis engine 520 receives the generated latency table. Isomorphic analysis engine 520 traverses the expressions in the generated latency table from largest latency to smallest latency. During the traversal, isomorphic statements with the same latencies are grouped together into vector sized parts. For example, if there are 6 isomorphic expressions with the same latency, and if the vector registers support two operands of the type in the expression trees, then 3 vector registers (6/2) will be used when vectorizing.

Traversing from largest latency to smallest ensures that the statements in the basic block are vectorized before their constituent expressions. This ensures that the vectorization of the longest expressions is performed first. As a result, the number of instructions that are vectorized is maximized and packing and unpacking operations are minimized.

In order to determine whether two expressions are isomorphic, isomorphic analysis engine 520 generates strings of the expressions and compares them. Specifically, the operands of the two expressions are dropped and the resulting strings are compared. If the resulting strings are the same, then the expressions are isomorphic.

Optimization engine 530 is optionally used to improve the generation of vectorization code. Specifically, optimization engine 530 reorders the original source code statements in the basic block before vectorization. The statements of the basic block are reordered because the reordering often makes generation of vectorization code easier. Optimization engine 530 is composed of a dependency calculator 531 and a statement reorderer 532.

Dependency calculator 531 calculates the dependencies of the statements in the basic block using a compute dependencies algorithm. Specifically, dependency calculator 531 calculates flow, anti-flow and output dependencies. A person of reasonable skill in the art would be aware of various algorithms that compute dependencies in a basic block.

Statement reorderer 532 traverses the dependencies calculated by dependency calculator 531 in depth-first order of occurrence and rewrites the statements of the basic block. The resulting rewrite of the basic block ensures expressions to be vectorized become adjacent and the conversion to vector instructions is simplified.

For example, in FIG. 1, statement 2 and statement 4 are vectorizable, i.e. they are independent, isomorphic and have the same latency in the latency table. Statement 3 must be evaluated before statement 4 because statement 4 loads f which is modified in statement 3. Therefore, after statement 2 and 4 are vectorized, the placement of the generated vector code is inserted after the last store to f, i.e., statement 3.

On the other hand, if the statements in FIG. 1 are reordered to move all the statements that the vectorized statement depends ahead of the vectorized statement, then the expressions to be vectorized become adjacent and conversion to vector instructions is simplified.

After optionally reordering the statements in the basic block, vectorization code is generated. Code generator 540 generates the vectorization code. Code generator 540 optionally include a packing optimizer 541 which reduces the cost of packing operands into vector registers.

Code generator 540 receives the expressions to be vectorized from the isomorphic analysis engine 520. Specifically, code generator 540 places the operands of the expressions to be vectorized into vector registers and applies the common operation of the grouped expressions to the vector registers.

Often the choice of which expression operands are packed in a certain vector register has an impact on the quality of the generated code. In an embodiment, code generator 540 packs expression operands in the order their corresponding statements appear in the original source code.

After generating the partial vectorization code for the group of expressions being vectorized, code generator 540 replaces the corresponding statements in the basic block with the new vectorization code.

Code generator 540 also includes a packing optimizer 541. Packing optimizer 541 takes the generated vectorization code and reduces the number of packing instructions generated. Specifically, the generation of packing instructions is reduced by permuting existing vector registers so that the desired packing can be obtained.

The permutation of existing vector registers can be achieved using the shuffle instruction of a microprocessor. For example, in an embodiment using the x86 SSE2 instruction set, packing optimizer 541 uses SHUFPS/SHUFPD instructions. These shuffle instructions copy packed single or double-precision floating-point values respectively from either of two sources to a destination, as specified by bit fields of an immediate byte operand. As a result, some packing/unpacking operations can be avoided. Packing optimizer 541 is explained in more detail in FIG. 7 below.

Figure 6:
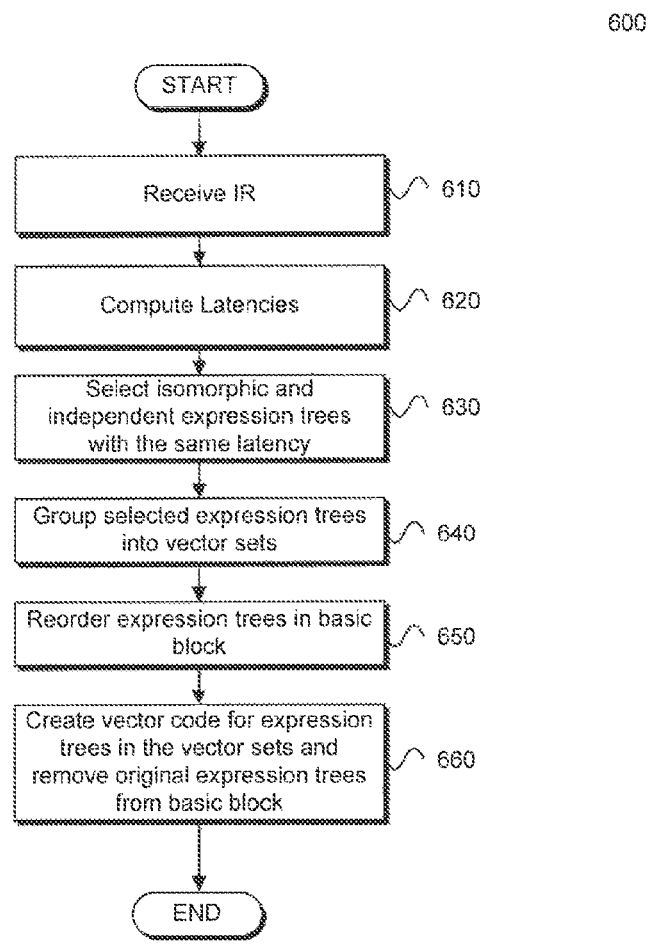
FIG. 6 illustrates a flowchart of an exemplary method 600 for performing scalable partial vectorization, according to an embodiment.

FIG. 6 is a flowchart of an exemplary method 600 illustrating the sequence of operations performed for scalable partial vectorization, according to an embodiment. Flowchart 600 includes operations 610 through 660. It is to be appreciated that not all steps may be required, nor performed in the order described.

In operation 610, the intermediate representation code of a basic block is received. The intermediate representation code is an internal compiler representation of a sequence of statements in a high level programming language like C/C++, Java, etc. In an alternative embodiment, the original source code of the basic block may be received.

In operation 620, a latency table is generated. Specifically, the dependence relations between expressions and their operands are determined and the expressions and operands are assigned an integer called cycle-count. The cycle-count of the expressions and operands is computed by adding one to the largest cycle-count of the expression or operand dependencies.

For example, if expression 1 depends on expressions 2 and 3, and if the cycle-count of expression 2 is greater than the cycle-count of expression 3, then the cycle-count of expression 1 is the cycle-count of expression 2 plus one. The cycle-counts of arguments of a function or constants are assumed to be zero.

As discussed above, all entries in the latency table, i.e., expressions, operands and constants, with the same cycle-count can be executed in parallel. For example in FIG. 2, (b=X1+2), (f=Y1−2), (a*e+d) and (a*i+h) have the same latency and thus can be executed in parallel. However, while expressions with the same cycle-count can be executed in parallel, not all expressions with the same cycle-count may be vectorized. Rather, only expressions that have the same cycle-count, and are isomorphic and independent can be vectorized.

In operation 630, isomorphic and independent expressions with the same latency in the latency table are identified. Specifically, after calculating the latencies of expressions and operands in operation 620, the latency table is traversed from largest latency to smallest latency. During the traversal, isomorphic expressions with the same latencies are grouped together into vector sized parts. Traversing from largest latency to smallest latency ensures that statements (i.e., complete expressions) are vectorized before their constituent expressions. This ensures that the longest expressions are vectorized. As a result, the amount of instructions that are vectorized is maximized and the number of packing and unpacking operations performed is minimized.

In order to determine whether two expressions are isomorphic, the expressions are converted to strings and then compared. Specifically, the operands of the two expressions are dropped and the resulting strings are compared. If the resulting strings are the same, then the expressions are isomorphic.

In operation 640, expressions that are isomorphic, independent and have the same latency in the latency table are grouped into vector sets. Often the choice of which expression operands are packed into a certain vector register has an impact on the quality of the generated code. In an embodiment, expression operands are packed in the order their corresponding statements appear in the original source code.

In operation 650, the statements corresponding to the selected expressions are optionally reordered in the basic block. This is because generation of vectorization code is often easier if the statements in the input basic block are reordered. For example, in FIG. 1, statement 2 and statement 4 are vectorizable, i.e., they are independent, isomorphic and have the same latency in the latency table. Statement 3 must be evaluated before statement 4 because statement 4 involves the loading the variable f that is modified by statement 3. Therefore, after statement 2 and 4 are vectorized, the placement of the resulting vector code is inserted after the last store to f in statement 3.

Alternatively, the statements in the basic block can be reordered. Specifically, the statements that the vectorized statement depends on are moved ahead of the vectorized statement. As a result, the expressions being vectorized become adjacent and converting to vector instructions is therefore simplified.

In an embodiment, in order to perform the reordering, the dependencies of the basic block are computed using a compute dependencies algorithm. A person of ordinary skill in the art would be aware of various other algorithms that compute dependencies in a basic block. After computing the dependencies, a topological reordering algorithm traverses the dependencies in depth-first order of occurrence and rewrites the basic block. The resulting rewrite of the basic block ensures expressions to be vectorized become adjacent and converting to vector instructions is easier.

Finally, in operation 660, vectorization code is generated and the original statements being vectorized are removed from the basic block source code.

While vectorization can improve performance, it is often not maximized because vectorization results in the needless generation of packing instructions. In an embodiment, vectorization code is made more efficient by using a shuffle instruction to reduce packing and unpacking costs.

FIG. 7 illustrates an optimization approach to reduce the amount of packing and unpacking instructions generated, according to an embodiment. Specifically, the generation of packing and unpacking instructions can be avoided where permuting an existing vector register can obtain the desired packing. This is achieved using shuffle instructions.

The shuffle instruction copies packed single and double-precision floating-point values from either of two sources to the destination, as specified by bit fields of an immediate byte operand. Various microprocessor architecture may have different shuffle instructions. For example, in the x86 SSE2 instruction set, the SHUFPS/SHUFPD instructions are provided.

In 701 there are four statements, S1 through S4. S1 and S2 are grouped for vectorization. Similarly, S3 and S4 are grouped for vectorization. When vectorizing S1 and S2, we require packing <a, b> and <p, q> into vector registers. When vectorizing S3 and S4, we require packing of <b, a> and <p, q> into vector registers.

In the traditional case illustrated in 702, <a, b> and <p, q> are packed into vector registers. In order to calculate the resulting <x, y> vector register, the <a, b> and <p, q> vector registers are added together. However, a problem occurs when calculating the <z, u> vector register. Specifically, additional packing and unpacking operations must be performed. The b scalar from the <a, b> vector register must be unpacked and the a scalar from the <a, b> vector register must also be unpacked. Both b and a are then repacked into a new vector register. The new vector register may then be added to the <p, q> vector register in order to calculate the <z, u> vector register result.

According to an embodiment in 703, these additional packing and unpacking operations can be avoided. <a, b> and <p, q> are packed into vector registers as previously discussed in 702. The <a, b> and <p, q> vector registers are then added together to calculate the resulting <x, y> vector register. However, when calculating the <z, u> vector register, the packing and unpacking operations of 702 can be avoided by using the shuffle instruction.

The shuffle instruction copies the packed vector values from either of two sources to the destination, as specified by bit fields of an immediate byte operand. In 703, the shuffle instruction is used to permute the <a, b> vector register. The shuffle instruction copies the b scalar first, and the a scalar second to a vector register. The resulting permutated vector register (i.e., <b, a>) is then used to perform an addition with the <p,q> vector register. The two unpack instructions and one pack instruction in 702 are eliminated as a result.

Embodiments presented herein, or portions thereof, can be implemented in hardware, firmware, software, and/or combinations thereof.

The embodiments presented herein apply to any communication system between two or more devices or within subcomponents of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 8:
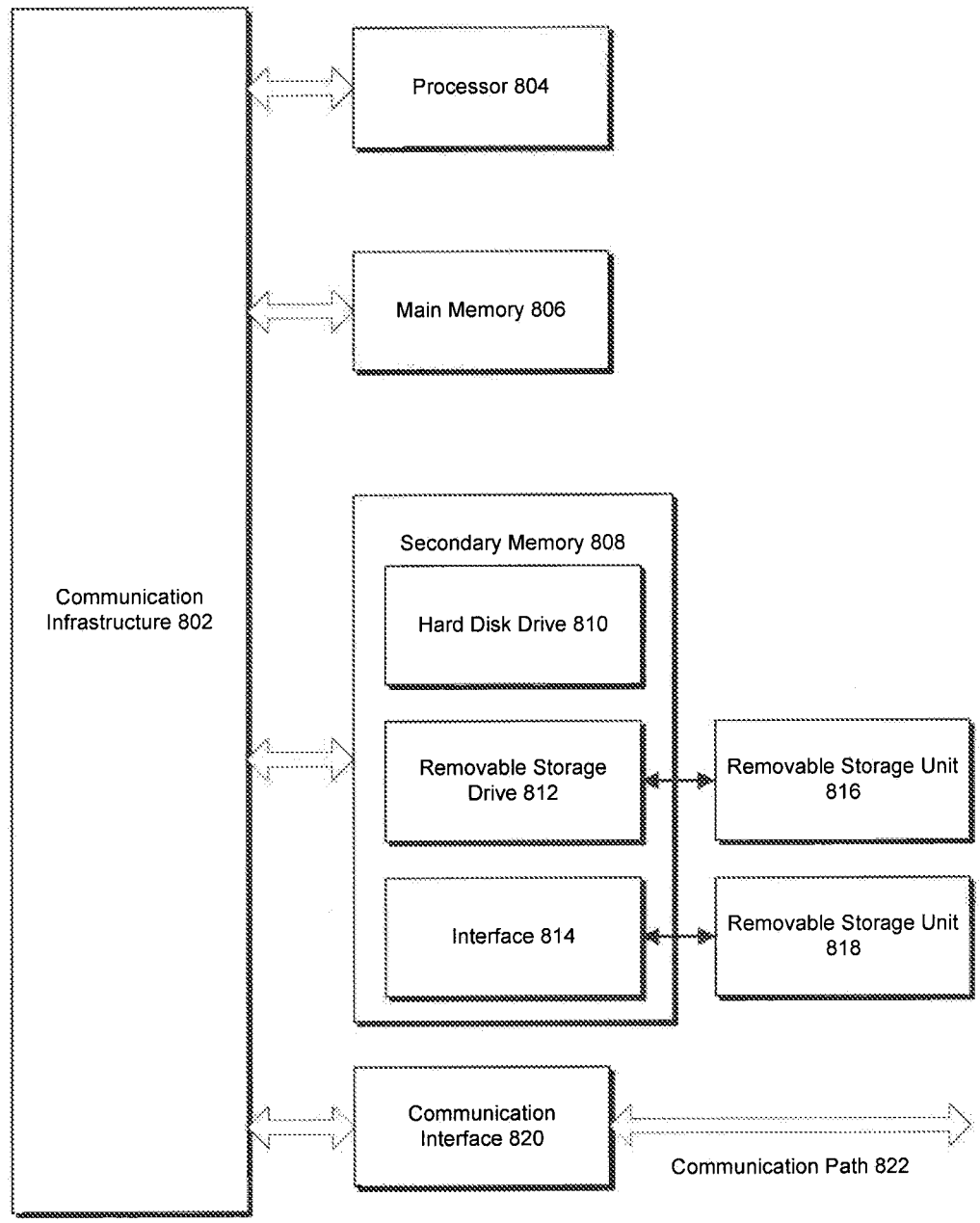
FIG. 8 illustrates a block diagram of an exemplary computer system on which the embodiments can be implemented

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 800 is shown in FIG. 8. The computer system 800 includes one or more processors, such as processor 804. Processor 804 can be a special purpose or a general purpose digital signal processor. The processor 804 is connected to a communication infrastructure 802 (for example, a bus or network). Various software implementations are described in terms of this exemplary computer system. After reading this description, it will become apparent to a person skilled in the relevant art how to implement the disclosure using other computer systems and/or computer architectures.

Computer system 800 also includes a main memory 806 (e.g., random access memory (RAM)), and may also include a secondary memory 808. Secondary memory 808 may include one or more of, for example, a hard disk drive 810 and/or a removable storage drive 812, representing a floppy disk drive, a magnetic tape drive, an optical disk drive, or the like. Removable storage drive 812 reads from and/or writes to a removable storage unit 816 in a well-known manner. Removable storage unit 816 represents a floppy disk, magnetic tape, optical disk, or the like, which is read by and written to by removable storage drive 812. As will be appreciated by persons skilled in the relevant art(s), removable storage unit 816 includes a computer usable storage medium having stored therein computer software and/or data.

In alternative implementations, secondary memory 808 may include other similar means for allowing computer programs or other instructions to be loaded into computer system 800. Such means may include, for example, a removable storage unit 818 and an interface 814. Examples of such means may include a program cartridge and cartridge interface (such as that found in video game devices), a removable memory chip (such as an EPROM, or PROM) and associated socket, a thumb drive and USB port, and another removable storage unit 818 and interface 814 which allow software and data to be transferred from removable storage unit 818 to computer system 800.

Computer system 800 may also include a communications interface 820. Communications interface 820 allows software and data to be transferred between computer system 800 and external devices. Examples of communications interface 820 may include a modem, a network interface (such as an Ethernet card), a communications port, a PCMCIA slot and card, etc. Software and data transferred via communications interface 820 are in the form of signals which may be electronic, electromagnetic, optical, or other signals capable of being received by communications interface 820. These signals are provided to communications interface 820 via a communications path 822. Communications path 822 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 816 and 818 or a hard disk installed in hard disk drive 810. Signals carried over communications interface 820 can also embody the logic described herein. Computer program medium and computer usable medium can also refer to memories, such as main memory 806 and secondary memory 808, which can be memory semiconductors (e.g. DRAMs, etc.). These computer program products are means for providing software to computer system 800.

Computer programs (also called computer control logic) are stored in main memory 806 and/or secondary memory 808. Computer programs may be received via communications interface 820 from removable storage units 816 and 818 or a hard disk installed in hard disk drive 810. Such computer programs, when executed, enable the computer system 800 to implement the present disclosure as discussed herein. In particular, the computer programs, when executed, enable processor 804 to implement the processes of the present disclosure, such as any of the methods described herein. Accordingly, such computer programs represent controllers of the computer system 800. Where the disclosure is implemented using software, the software may be stored in a computer program product and loaded into computer system 800 using removable storage drive 812, interface 814, or communications interface 820.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

The Summary and Abstract sections may set forth one or more but not all exemplary embodiments as contemplated by the inventor(s), and thus, are not intended to limit the embodiments and the appended claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concept of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A method for reducing packing and unpacking costs, comprising:
   computing latencies of a plurality of expression trees in a basic block;
   selecting a first and a second expression tree from the plurality of expression trees based on the computed latencies, wherein the first expression tree is isomorphic and independent to the second expression tree;
   generating vectorization code based on the first and second expression trees, wherein at least one of the computing, the selecting and the generating are
   executed on a digital device.

2. The method recited in claim 1, wherein the selecting includes selecting the first and the second expression trees based on an order of selection of from largest to smallest latency.

3. The method recited in claim 2, wherein the first expression tree and the second expression tree have the same latency.

4. The method recited in claim 1, further comprising:
   computing dependencies between a plurality of statements in the basic block;
   and
   reordering the plurality of statements based on the computed dependencies.

5. The method recited in claim 1, further comprising:
   removing identifiers from the first and second expression trees to provide first and second identifier-free expression trees; and
   determining whether the first and second identifier-free expression trees are isomorphic by comparing the first and second identifier-free expression trees.

6. The method recited in claim 1, further comprising:
   packing one or more operands of the first expression tree into a first vector;
   and
   packing one or more operands of the second expression tree into a second vector.

7. The method recited in claim 6, further comprising:
permuting the second vector, wherein the one or more operands in the second vector are the same as the one or more operands in the first vector.

8. A computer-readable non-transitory storage device having computer executable instructions stored thereon, execution of which, by a computing device, cause the computing device to perform operations, reducing packing and unpacking costs in vector registers, comprising:
computing latencies of a plurality of expression trees in a basic block;
selecting a first and a second expression tree from the plurality of expression trees based on the computed latencies, wherein the first expression tree is isomorphic and independent to the second expression tree;
generating vectorization code based on the first and second expression trees.

9. The computer-readable non-transitory storage device recited in claim 8, wherein the selecting includes selecting the first and the second expression trees based on an order of largest to smallest latency.

10. The computer-readable non-transitory storage device recited in claim 9, wherein the first expression tree and the second expression tree have the same latency.

11. The computer-readable non-transitory storage device recited in claim 8, further comprising:
computing dependencies between a plurality of statements in the basic block;
and
reordering the plurality of statements based on the computed dependencies.

12. The computer-readable non-transitory storage device recited in claim 8, further comprising:
removing identifiers from the first and second expression trees; and determining whether the first and second identifier-free expression trees are isomorphic by comparing the first and second identifier-free expression trees.

13. The computer-readable non-transitory storage device recited in claim 8, further comprising:
packing one or more operands of the first expression tree into a first vector; and
packing one or more operands of the second expression tree into a second vector.

14. The computer-readable non-transitory storage device recited in claim 13, further comprising permuting the second vector, wherein the one or more operands in the second vector are the same as the one or more operands in the first vector.

15. A system, for reducing costs of packing and unpacking vector registers, comprising:
a memory; and
at least one processor coupled to the memory and configured to:
compute latencies of a plurality of expression trees in a basic block;
select a first and a second expression tree from the plurality of expression trees based on the computed latencies, wherein the first expression tree is independent and isomorphic to the second expression tree;
generate vectorization code based on the first and second expression trees.

16. The system recited in claim 15, wherein the selecting includes selecting the first and the second expression trees based on a latency order of from largest latency to smallest latency.

17. The system recited in claim 16, wherein the first expression tree and the second expression tree have the same latency.

18. The system recited in claim 15, wherein the at least one processor is further configured to:
compute dependencies between a plurality of statements in the basic block; and
reorder the plurality of statements based on the computed dependencies.

19. The system recited in claim 15, wherein the at least one processor is further configured to:
remove identifiers from the first and second expression trees; and
determine whether the first and second identifier-free expression trees are
isomorphic by comparing the first and second identifier-free expression trees.

20. The system recited in claim 15, wherein the at least one processor is further configured to:
pack one or more operands of the first expression tree into a first vector; and pack one or more operands of the second expression tree into a second vector.

21. The system recited in claim 20, wherein the at least one processor is further configured to:
permute the second vector,
wherein the one or more operands in the second vector are the same as the one or more operands in the first vector.

* * * * *